United States Patent [19]

Price

[11] 4,301,910
[45] Nov. 24, 1981

[54] SELF-PROPELLED RECEPTACLE-CONVEYOR BACKFILLING APPARATUS

[75] Inventor: Robert Price, Caledonia, Mich.

[73] Assignee: Kros Konveyors, Inc., Grand Rapids, Mich.

[21] Appl. No.: 71,394

[22] Filed: Aug. 30, 1979

[51] Int. Cl.³ .............................................. B65G 41/00
[52] U.S. Cl. .................................. 198/304; 198/311; 37/142.5; 405/179
[58] Field of Search ............... 198/300, 302, 304, 311, 198/306, 303; 405/179; 37/142.5

[56] References Cited

U.S. PATENT DOCUMENTS

| | | | |
|---|---|---|---|
| 3,361,248 | 1/1968 | Daymon | 198/303 |
| 3,391,776 | 7/1968 | Hancock et al. | 198/304 |
| 3,583,168 | 6/1971 | Horton | 37/142.5 |

FOREIGN PATENT DOCUMENTS 1065784  11/1979  Canada .............................. 198/302

*Primary Examiner*—Joseph E. Valenza

*Attorney, Agent, or Firm*—Price, Heneveld, Huizenga & Cooper

[57] ABSTRACT

A machine is disclosed to be used in the trenching operation necessary for burying utility facilities such as water, sanitary pipes or gas mains. The machine includes an elongated, boom-like body having a large earth receiving hopper and a conveyor belt for transporting the earth to the rear and discharging it. It is equipped with a power plant in front and, while in operation at a trenching site, a hydraulically powered propulsion unit which pulls the machine along the trench. Its rear end is shaped and elevated such that earth moving equipment can operate beneath it and thus lay pipe, backfill and compact the trench between the ends of the machine using the earth discharged by the machine at its rear end. The rear portion of the machine is equipped with wing-like legs provided with wheels which support the rear of the machine while it is bridged over the trench. For transport from site to site, the propulsion unit is detached and by the same fifth wheel connection the front end of the machine is secured to a conventional truck tractor.

4 Claims, 8 Drawing Figures

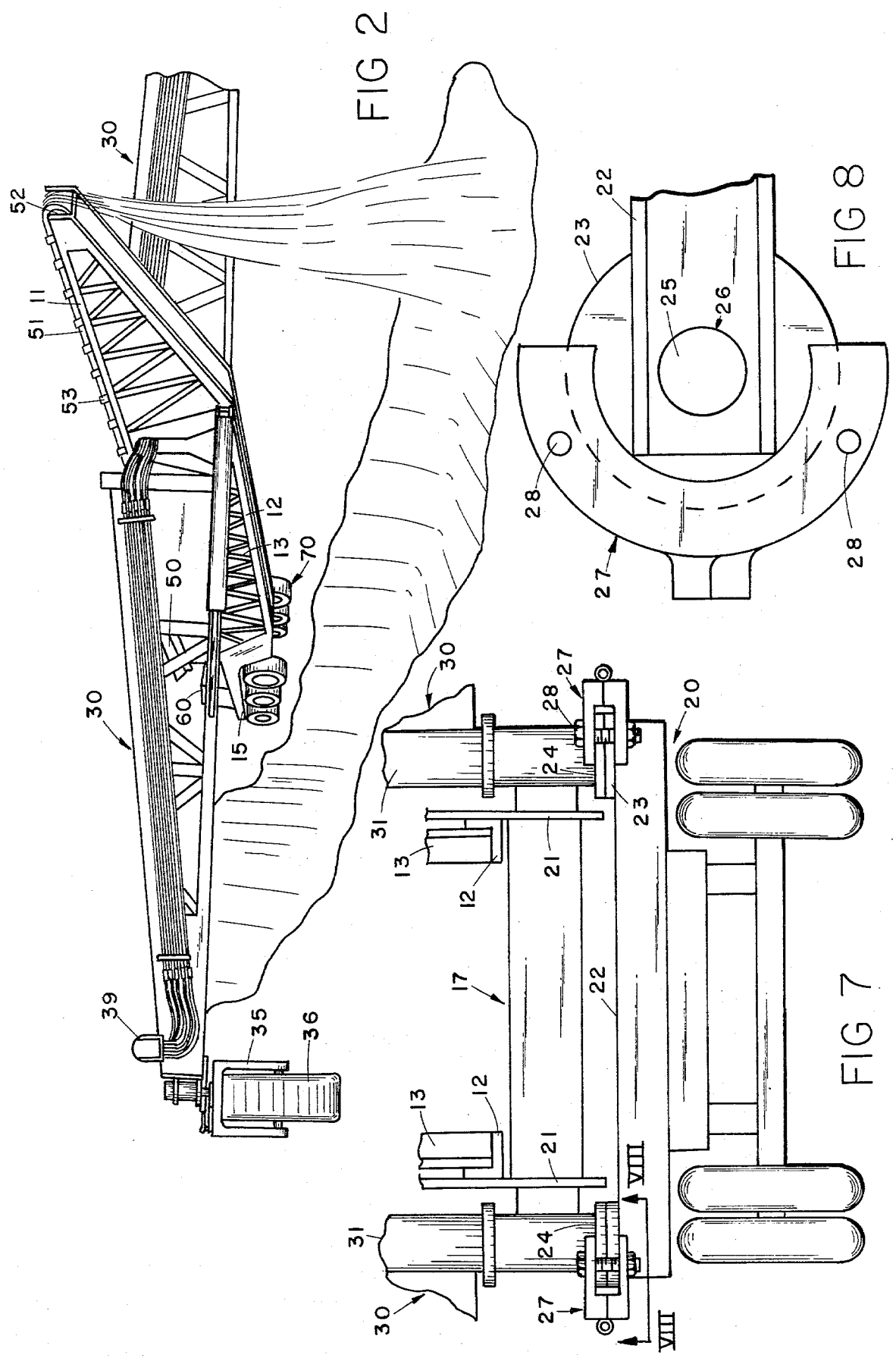

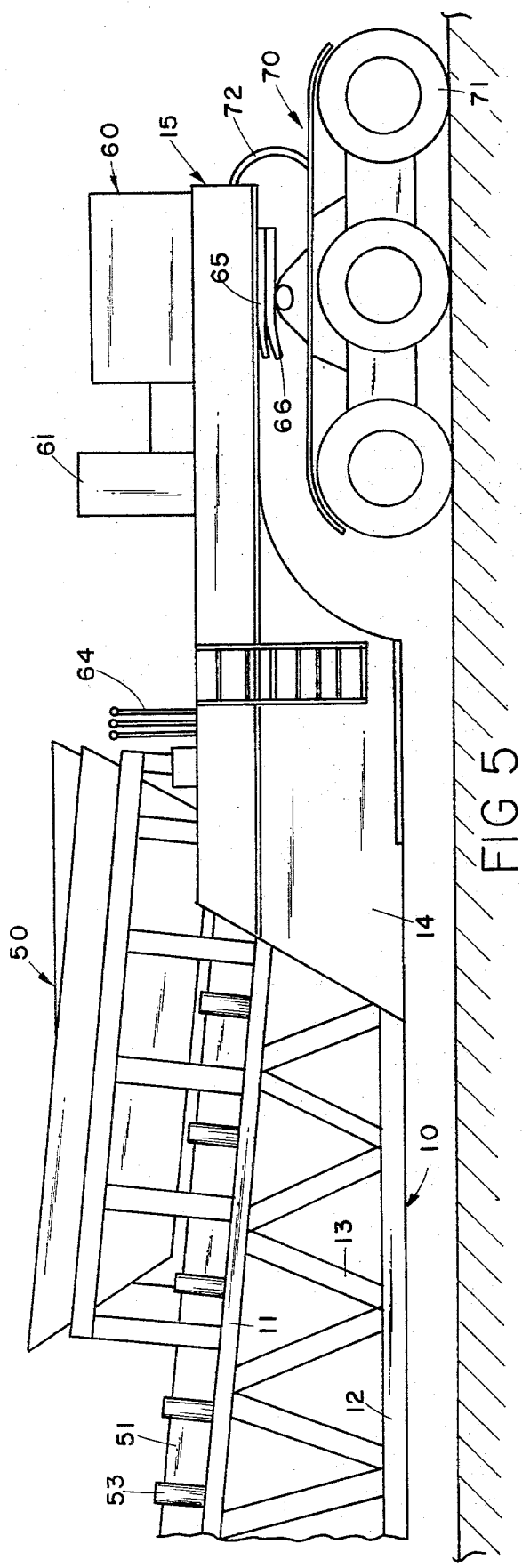
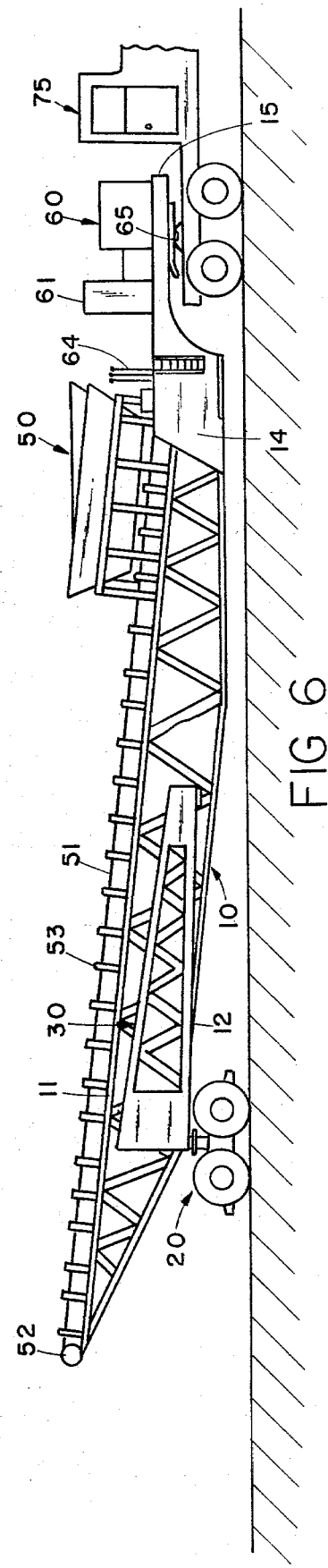
FIG 5
FIG 6

4,301,910

SELF-PROPELLED RECEPTACLE-CONVEYOR BACKFILLING APPARATUS

BACKGROUND OF THE INVENTION

The invention relates to earth conveying equipment for facilitating a trenching operation particularly designed for use in laying sewer, water, gas and similar underground pipe facilities. It is particularly useful in developed areas where the pipes are laid along a street or a road. The equipment is designed to have a length such that between the forward end of the machine which receives dirt removed to form the trench and the rear of the machine where the earth is discharged, there is sufficient distance that the pipe can be laid and aligned and the earth being discharged by the machine initially compacted to permit immediate backfill. Thus, the machine eliminates the necessity of piling the earth beside the trench, laying the pipe and then refilling the trench and cleaning up the mess that remains after the refill. In operation, the equipment is moved slowly along the trench, the rate of movement being governed by the depth of the trench and thus the rate at which the material is removed to form the trench and, at the same time, the rate at which the material can be deposited at the other end and effectively backfilled and compacted. Equipment of this general type is known and has, in the past, been utilized. The present invention represents an improvement in this type of equipment.

BRIEF DESCRIPTION OF THE INVENTION

The conveying device of this invention utilizes an elongated body member preferably constructed like a box girder. At its foward end, the equipment has a receiving hopper and means to power a suitable conveyor such as an endless belt which extends from beneath the hopper to the rearward end of the equipment. Extending from the front end is a gooseneck which provides a mounting platform for the primary power equipment used to operate the machine when it is in conveying mode. The gooseneck has a conventional fifth wheel plate permitting it to be secured to and supported on a wheeled propelling member powered from the primary power unit on top of the gooseneck for operating the unit in the conveying mode. When it is to be transported between operating sites, the propelling unit is removed and, by means of the same fifth wheel plate, the unit is secured to a truck tractor.

The rearward end of the unit is equipped with a pair of legs having wheels on the ends. These are designed to either be folded against the body of the equipment when it is in transport mode or to be extended laterally like a pair of wings on each side when the equipment is in conveying mode. The legs are of such length that the span between the wheels permits the equipment to bridge the trench without putting ground pressure adjacent the trench walls which would collapse them. These legs support the rearward end of the equipment at a height that permits earth moving equipment such as a bulldozer to operate beneath the rearward end of the equipment to lay pipe and to backfill and compact as the equipment moves forwardly.

For transport mode the legs are folded parallel to the body of the machine and the rearward end of the unit is mounted on a detachable transport dolly. When in conveying or trenching mode, the forward end of the unit travels along one side of the trench while the rearward end of the unit bridges over the trench and the discharge end of the unit is aligned with the trench so that the dirt is returned to the trench for backfilling purposes.

BRIEF DESCRIPTION OF THE DRAWINGS

FIG. 2 is a perspective, somewhat schematic rear view of the invention in operation; FIG. 5 is a fragmentary, side elevational view of the forward end of the machine as it is equipped for trenching mode; and FIG. 6 is a side elevational view of the machine as it is equipped for site-to-site transport; and FIG. 7 is a fragmentary rear sectional view of the transport dolly secured to the conveyor's body; and FIG. 8 is a fragmentary, sectional view taken along the line VIII-VIII of FIG. 7.

DESCRIPTION OF THE PREFERRED EMBODIMENT

Figure 1:
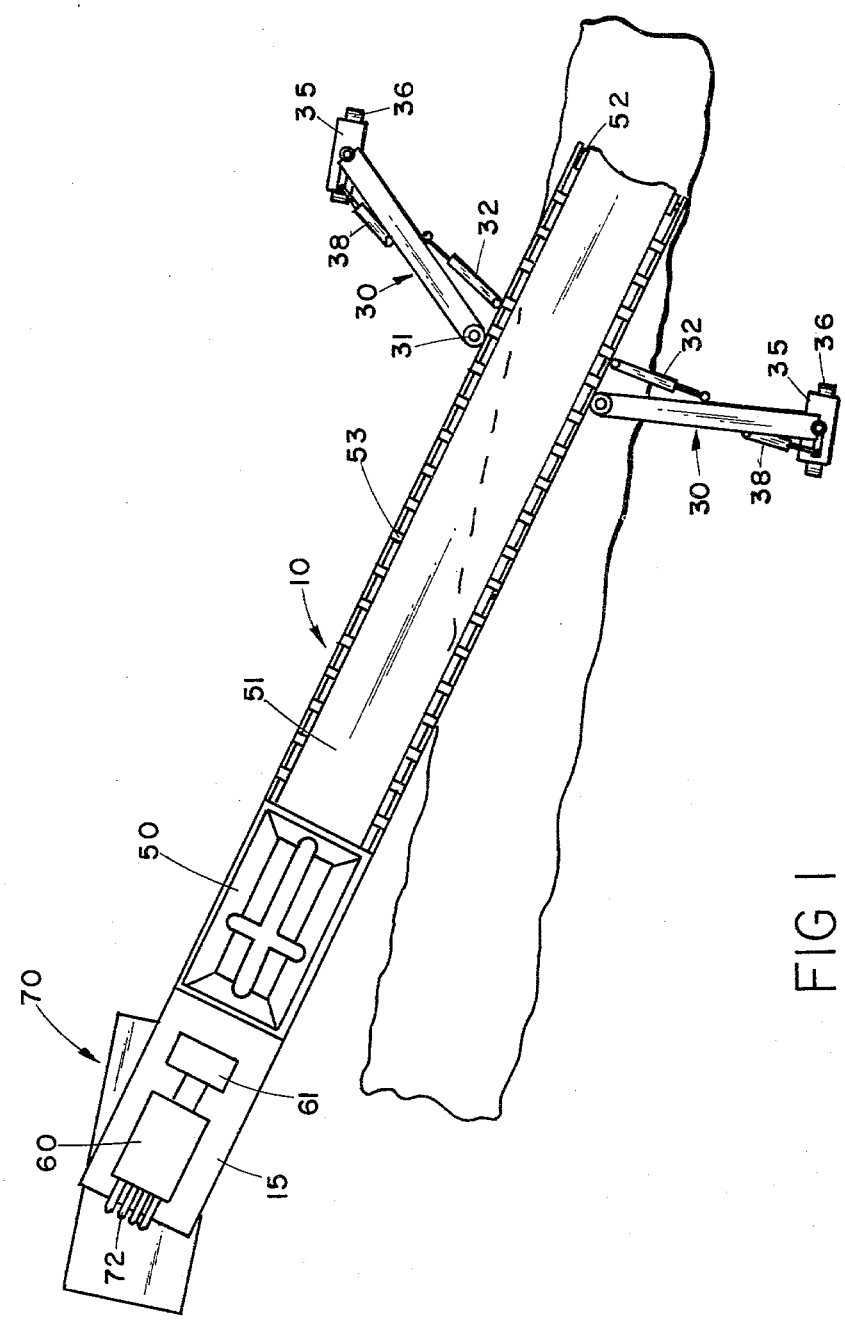
FIG. 1 is a somewhat schematic, plan view of the conveyor incorporating this invention.

The main body or boom 10 of the conveying machine is basically a girder of rectangular cross section consisting of upper and lower beams 11 and 12 tied together by diagonal struts 13. This type of construction is conventional for long girders such as used in building construction, bridges or for crane booms. The forward end of the main body is secured to a drive enclosure 14 of generally welded plate, the upper forward portion of which extends forwardly as a gooseneck 15 of the type typical of so-called flatbed, gooseneck trailers.

The forward portion of the main body is of increasing cross section as it extends rearwardly (FIG. 6). At a point well forward of the midpoint of the body, the cross-sectional size and shape of the body becomes uniform. The rearward portion of the body is tapered to provide an upwardly sloping lower face. At the point of juncture between the tapered, rearward portion and the main portion of the body, a cross beam 17 is provided which serves both as a reinforcement brace and as the attachment member for the transport dolly 20 (FIGS. 6, 7 and 8). The beam is welded to the side plates 21 and to the lower frame members 12.

Mounted on opposite sides of the main body is a leg 30. The legs 30 are pivotally secured by suitable hinges 31 to the main frame substantially in alignment with the beam 17 (FIG. 7). The legs 30 are mounted to pivot from a transport position in which they extend forwardly substantially parallel to the main frame as shown in FIG. 6 to a position in which they are either generally normal to the axis of the main frame or swept back in a wide, V-shape as illustrated in FIG. 1. The position of the legs 30, when laterally extended, is controlled and stabilized by the hydraulic actuators 32 (FIG. 1).

Figure 4:
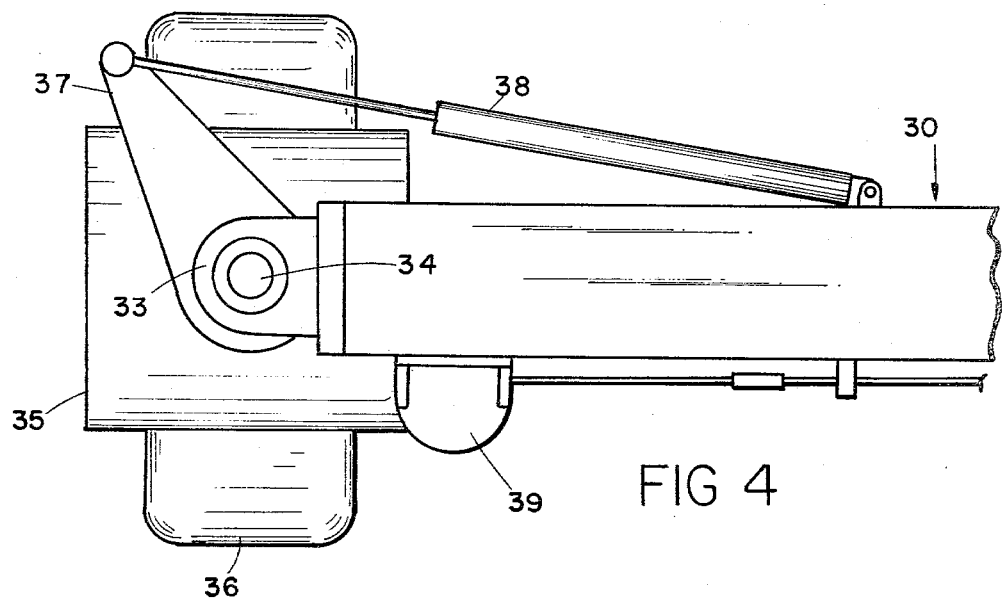
FIG. 4 is a fragmentary plan view of the structure illustrated in FIG. 3.
Figure 3:
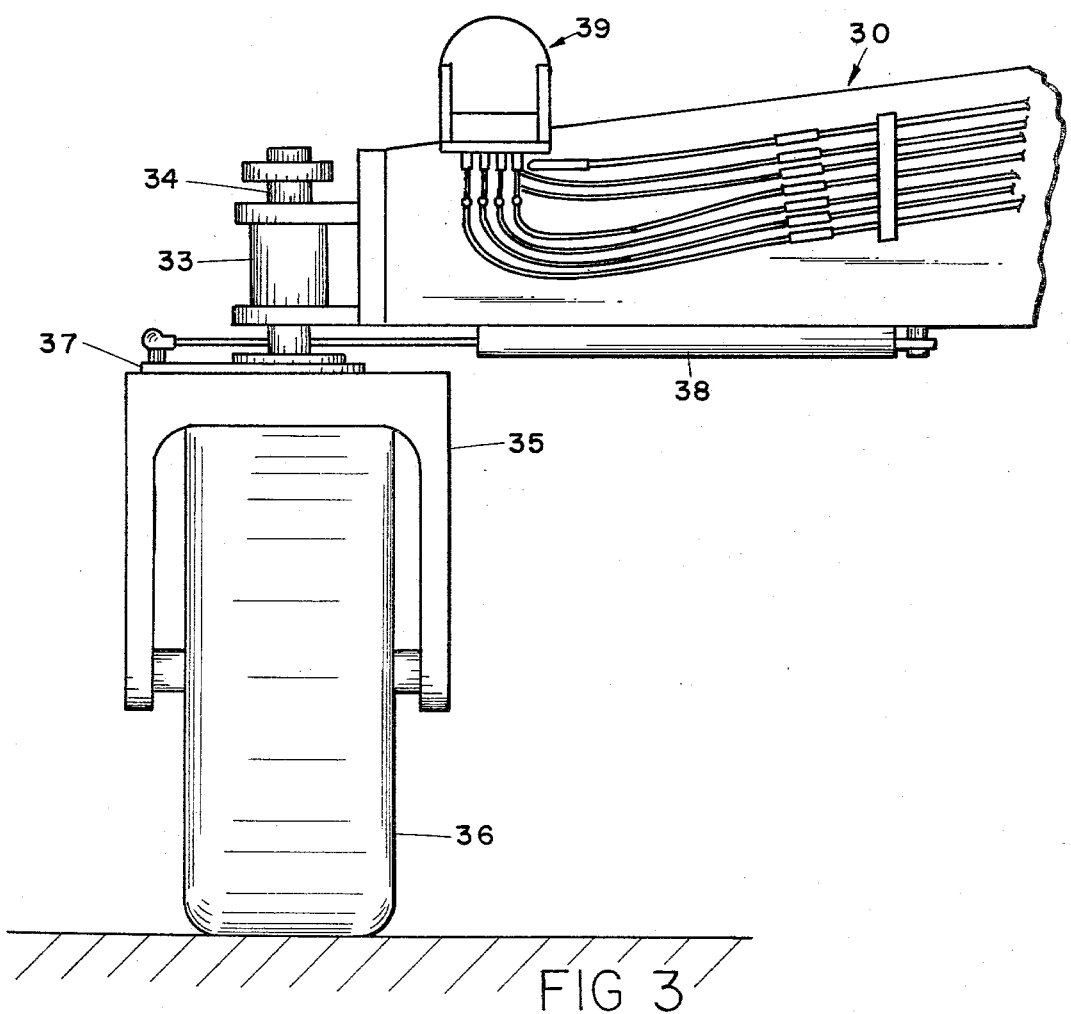
FIG. 3 is an enlarged, fragmentary view of the wheel pod and controls at the end of one of the rear supporting legs.

The outer end of each of the legs is equipped with a bearing 33 to receive the wheel spindle 34 for the wheel pod 35 (FIGS. 3 & 4). Each wheel pod rotatably mounts a supporting wheel 36. As best seen in FIG. 4, each wheel pod has a forwardly extending arm 37 connected to an hydraulic actuator 38. These are utilized to pivot the wheel on its spindle and, thus, steer the rear portion of the trenching machine and keep it centered over the trench. The steering of the wheels 36 and the angular position of the legs 20 are individually controlled from a control center 39 adjacent each of the wheels (FIG. 3). Because of the operating environment of the equipment, it is necessary to provide separate and individual controls for each leg and each wheel. Since the machine has to be capable of adjusting to avoid obstructions such as trees, utility facilities and the like, which are at various spacings from the path of the trench, it is necessary that each leg be capable of individual angular adjustment to maintain the discharge of the unit properly aligned with the trench.

It is important to the function of the conveying machine that its rear portion is supported sufficiently above the trench that earth moving equipment such as a bulldozer can pass under it and operate beneath the machine without interference. This construction of the rear of the machine invention permits the earth moving equipment to push the material discharged by the machine forwardly under the rear portion of the machine to cover the pipe as it is laid. This is important because it permits orderly backfilling and proper compaction of the backfill around the pipe during the initial stages of the backfill procedure. Thus, the material, as it is discharged from the machine, is deposited on an area of the trench which is already largely backfilled. This construction is also desirable because it permits the pipe to be placed in the trench from the rear as well as the side when such procedure is desirable. This objective is accomplished by combining the clearance created by locating the wheels and pods beneath the legs 30 and that provided by the upward taper of the lower face of the rear portion of the body. One of these features without the other cannot accomplish the objective. If it were attempted to eliminate the latter, the size of the wheels would have to be such as to elevate the rear end of the body to a point where it would interfere with overhead obstructions such as utility wires and trees. On the other hand, it would be structurally unsatisfactory to attempt the result using the body taper alone.

A larger hopper 50 is mounted at the forward end of the main frame. This hopper is seated over an endless conveyor belt 51 which extends the full length of the main frame, passing over idler rollers 52 at its discharge, rearward end. It is driven by a suitable hydraulic motor located within the drive enclosure. In the preferred embodiment of this machine, the drive mechanism is hydraulically powered. This, however, is a matter of choice. The mechanism by which the belt is driven is neither illustrated nor described since it is conventional and any of a number of commercially available mechanisms may be used for this purpose. Its particular design forms no part of this invention.

The upper run of the belt 51 is supported by rollers 53 arranged in an inclined position to form the belt into a trough in a manner well known in the conveyor field.

Mounted on the platform 15 formed by the gooseneck is a prime mover 60 which is connected to and drives the hydraulic pump mechanism 61 for the belt 51 and the actuators for pivoting the legs 30 and controlling the attitude of the wheels 36. The area between the pump 61 and the hopper 50 serves as a command station from which an operator can observe the operation of the machine, steer the machine's front end and control the operation of the belt 51 because it is necessary for the operator to stand to be able to properly observe the machine's operation, the levers 64 which actuate the controls are designed to be at a height convenient for a standing operator.

Mounted beneath the gooseneck 15 is a fifth wheel plate 65 which cooperates with the fifth wheel plate 66 pivotally mounted on top of the propulsion unit 70. The fifth wheel plates 65 and 66 are conventional both in design and function and are the same as those used on truck tractor-trailers conventionally operated on the road.

The propulsion unit 70 both supports the front end of the conveying machine and provides the power system for pulling the machine forward during the actual trenching operation, that is, while the machine is in trenching mode. In the preferred embodiment, the propulsion unit has multiple wheels 71, at least the front and back pairs of which are powered by individual hydraulic motors. The motors for the wheels are connected to the hydraulic pump 51 through the controls connected to the levers 64 and a plurality of hydraulic hoses 72 (FIGS. 1 and 5). By supplying more or less hydraulic fluid to selected ones of the motors, the propulsion unit can be steered for guiding the machine along the path to be followed by the trench. The use of hydraulic motors for propulsion is particularly desirable because this type of motor can be operated at very low speeds without damage to its mechanism. Thus, a very slow and uniform forward speed can be maintained, accurately graduated within a narrow range. Further, because the wheels can be individually actuated and controlled, the unit can be steered in a manner to negotiate any type corner the overall length of the machine permits. The machine can be guided through complex and narrow areas such as are often encountered in this type of trenching operation in densely populated areas. The specific details of the construction of the propulsion unit 70 are neither illustrated nor described since they are not part of the invention. The specific construction details of the propulsion unit are not part of this invention since the unit was designed for an entirely different type of service.

The propulsion unit 70, while ideal for moving the machine under the type of conditions required when the machine is actually working in a trenching operation, is not suitable for site-to-site transit because it is slow and does not adapt itself readily to over-the-road operation. Accordingly, for site-to-site transit, the propulsion unit 70 is removed and replaced by a conventional truck tractor unit 75 (FIG. 6). The substitution of the truck tractor 75 is relatively simple because the fifth wheel plate 65 will connect with the cooperating plate on the truck tractor. During substitution, the front end of the machine can be supported by a crane or, as an alternative, some type of extendable legs could be provided beneath the drive enclosure.

When the unit is to be prepared for transfer between construction sites, the rear of the machine is elevated by any conventional means such as being lifted by a crane. The wheels 36 are removed and the legs 30 are folded forward substantially parallel to the sides of the body 10 (FIG. 6). Whether the wheels and wheel pods are removed before or after the legs are folded to transport position is immaterial. However, before the legs are completely folded to their transport position, the actuators 32 are disconnected. At the same time, the transport dolly 20 is put into place. The width of the beam 22 is such that its ends extend beneath the hinges 31 for the legs 30. A plate 23 is secured to the top of each end of the beam. This plate is aligned with a similar plate 24 on the bottom of the hinge 31. A large, heavy stub pin 25 extends below the plate 24 and seats in a closely fitting opening 26 extending through both the plate 23 and the top of the beam 22 (FIG. 8). After the stub pins 25 hav been seated in the openings 26 the dolly 20 is clamped to the machine by a pair of semi-circular clamps 27 each secured by a pair of bolts 28 (FIGS. 7 & 8).

While in trenching mode, the forward end of the machine travels to one side of the trench as the latter is being excavated. The excavating function is performed by conventional equipment such as a crane or large backhoe. As the earth is removed to create the trench it is deposited in the hopper 50. The initial quantity of earth removed to create a trench the length of the machine is removed from the site for storage for use to fill the last section of the trench on completion of the project. Thereafter, the machine is moved forward receiving earth while the pipe is laid ready for backfill. This is done in that portion of the trench which is intermediate the ends of the trencher. After enough pipe has been laid to permit initial backfill the earth removed from the trench is loaded into the hopper and the conveyor belt is started, transferring this earth to the rear to be discharged to provide the backfill. The discharged earth is then pushed forwardly under the machine to cover the pipe and initial compaction is done. This is done with a bulldozer or other suitable earth moving equipment. For this purpose it is essential that the earth moving equipment be able to operate in a partially filled trench at least as far forwardly as the beam 17.

While a preferred embodiment of the invention has been described, it will be understood that various modifications of the invention can be made without departing from the principles of the invention. Such modifications are considered included in the hereinafter appended claims unless the claims, by their express language clearly states otherwise.

The embodiments of the invention in which an exclusive property or privilege is claimed are defined as follows:

1. A conveying machine for trenching operations, said machine having an elongated boom forming a primary body; a driven material conveyor member extending substantially the length of said body, a receiving hopper at one end of said conveyor member, a gooseneck platform extending forwardly from said body and a primary power plant mounted on said gooseneck, a propelling unit; means for detachably securing said propelling unit to said machine beneath said gooseneck; a pair of leg booms pivotally mounted to said primary body one on each side and adjacent the rearward portion thereof for outward swinging movement; a pair of wheel mounts one beneath the outer end of each of said leg booms and each having an upwardly extending spindle, a verticle spindle receiving socket at the outer end of each of said leg booms rotatably receiving one of said spindles; a ground engaging wheel in each of said mounts; a pair of first powered elements each connected to said body and to one of said leg booms for pivoting said leg booms with respect to said primary body; a pair of second powered elements each connected to one of said wheel mounts for rotating said mounts and wheels about their spindles; control means mounted on each of said leg booms and connected to said first and second powered elements for controlling their operation.

2. A conveying machine for trenching operations as described in claim 1 wherein said first and second powered elements are hydraulically operated and said control means are valves.

3. A conveying machine for trenching operations as described in claim 2 wherein said valves are manually operable and said control means are mounted adjacent the outer end of each of said leg booms.

4. A conveying machine for trenching operations, said machine having an elongated boom forming a primary body, a driven material conveyor member extending substantially the length of said body, a receiving hopper at one end of said conveyor member, a gooseneck platform extending forwardly from said body and a primary power plant including a source of hydraulic fluid under pressure mounted on said gooseneck, an hydraulically operated propelling unit; means for detachably securing said propelling unit to said machine beneath said gooseneck; means for connecting said propellng unit to said hydraulic fluid source to power said propelling unit; a pair of leg booms pivotally mounted to said primary body one on each side and adjacent the rearward portion thereof for outward swinging movement; a pair of wheel mounts one beneath the outer end of each of said leg booms and each having an upwardly extending spindle, a vertical spindle receiving socket at the outer end of each of said leg boooms rotatably receiving one of said spindles; a ground engaging wheel rotatably secured to each of said mounts; hydraulically operated first means for independently pivoting each of said leg booms and hydraulically operated second means for independently pivoting each of said wheel mounts about its spindle; control means on each of said leg booms for controlling the operation of said first and second means.

* * * * *